June 1, 1948. B. B. DUNCAN 2,442,641
METHOD OF MAKING HOLLOW PROPELLER BLADES
Filed Jan. 26, 1944
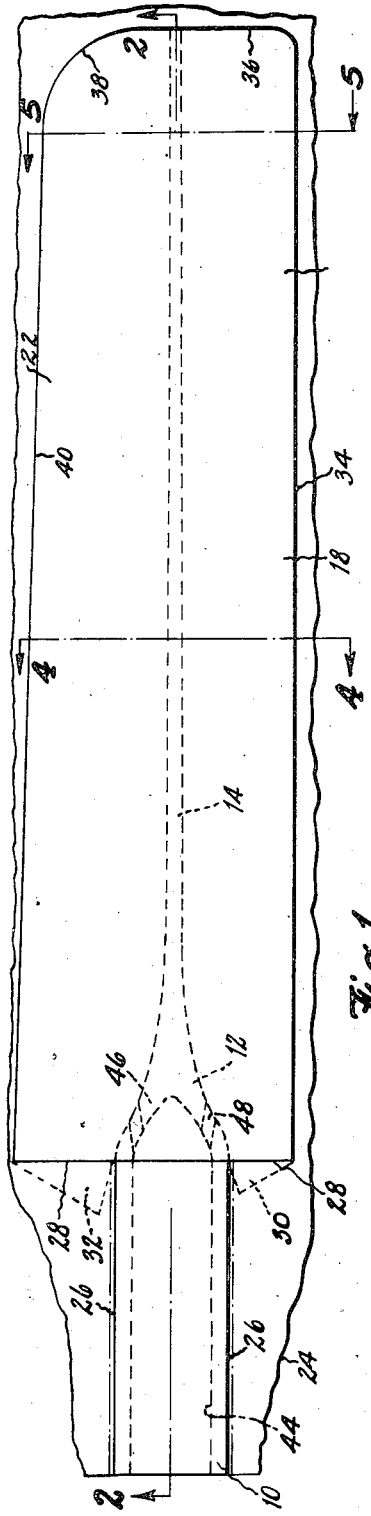
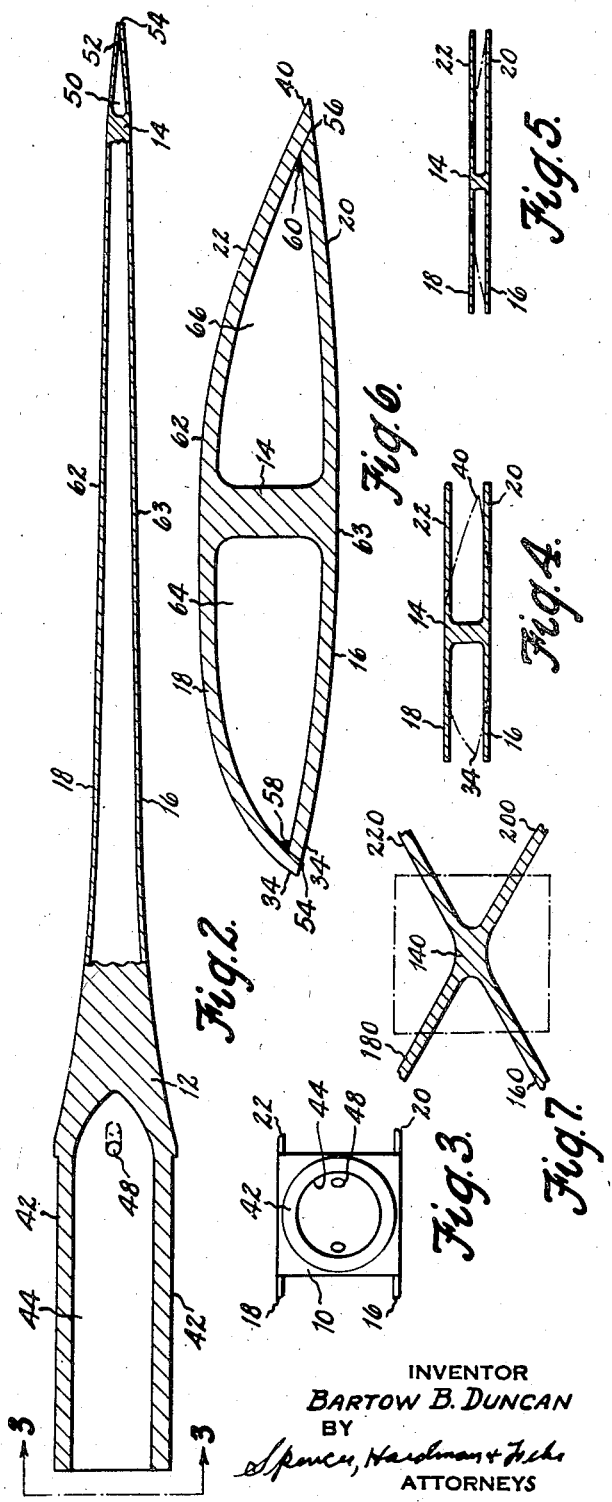
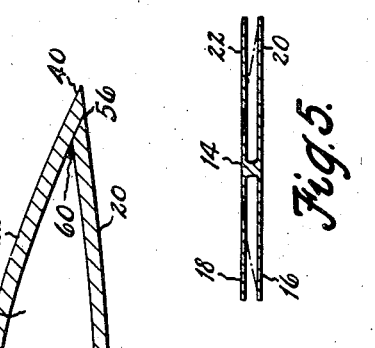
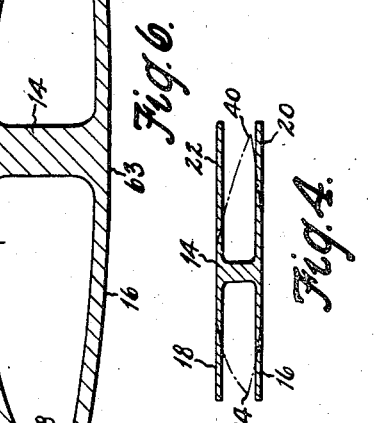
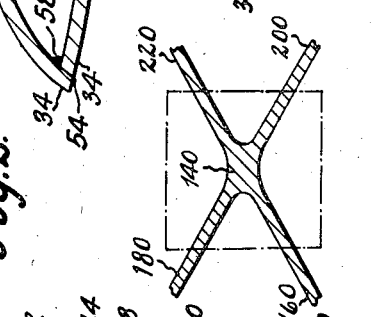
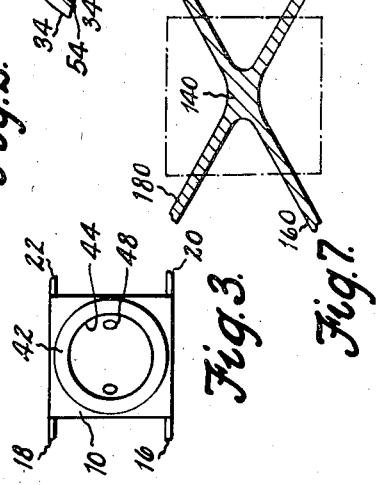
INVENTOR
BARTOW B. DUNCAN
BY
*Spencer, Hardman & Ficke*
ATTORNEYS

Patented June 1, 1948

2,442,641

UNITED STATES PATENT OFFICE 2,442,641

METHOD OF MAKING HOLLOW PROPELLER BLADES

Bartow B. Duncan, Dayton, Ohio, assignor to General Motors Corporation, Detroit, Mich., a corporation of Delaware Application January 26, 1944, Serial No. 519,756

6 Claims. (Cl. 29—156.8)

This invention relates to an airfoil for aircraft and a method of making the same with an integrally joined thrust member for anchoring the airfoil and a pair of integrally joined face members for giving cross sectional contour to the airfoil.

One of the objects of the invention is to provide an airfoil of one piece construction thereby eliminating all joints of assembly, subject to separation or rupture.

Another object of the invention is to provide an airfoil, particularly a propeller blade, that has the face members integrally joined to a thrust member or spar.

Another object of the invention is to provide a propeller blade with a minimum number of parts that must be bonded together.

Still another object of the invention is to provide a method for fabricating a hollow propeller blade of airfoil section from a single billet of metal.

Further objects and advantages of the present invention will be apparent from the following description, reference being had to the accompanying drawings wherein a preferred embodiment of the present invention is clearly shown.

In the drawings:

Fig. 1 is a view in plan form showing a billet of metal after working through certain of the steps herein disclosed, with a superposed outline of the finished blade.

Fig. 2 is a longitudinal sectional view thereof substantially as indicated by the line and arrows 2—2 of Fig. 1.

Fig. 3 is an end view of the blade at the root end looking toward the tip, substantially as indicated by the line and arrows 3—3 of Fig. 2.

Figs. 4 and 5 are sectional views transverse of the blade after certain steps in the process of forming, but before the final forming operation, substantially as indicated by the lines and arrows 4—4 and 5—5 of Fig. 1, the dot and dash lines showing the ultimate cross sectional contour to which the forming is to be reduced.

Fig. 6 is an enlarged sectional view illustrating the structural configuration of one form of blade suggested by the dot and dash lines of Fig. 4.

Fig. 7 is a view of a modified form of rolled stack from which a hollow blade of integral construction may be built.

Airfoils, particularly propeller blades, of composite form or those in which a plurality of structural members such as spars and face plates are assembled and bonded together by welding, brazing, or the like, are subject to rupture and separation at the joints of the bond which introduce vibration if not serious damage or failure of a blade. Once a bond starts to open, the early failure of the blade is assured, and the defect may seriously affect the function and performance of an engine, even if it does not immediately result in a substantial loss of efficiency, or complete failure. Herein is disclosed a method of making a propeller blade with the rib or spar comprising an integral part of the blade root, thrust face, and camber face. The blade could be rolled, formed or forged or both from a billet of steel or the like, and could be rolled into a tapered I-beam or H-beam with extended flanges as shown in Figs. 4, 5 and 7. That could be accomplished by rolling the web on rollers which taper around the circumference and with a circumference equal to or greater than the length of the blade to be rolled. On the other hand, the same result can be accomplished by rolling through a succession of or train of stepped rolling elements. The flanges could be rolled at the same time by rollers on each side of the flanges or during a separate operation. By operating the rollers on pivots the twist could be put in the blade. Otherwise the rib or spar could be twisted as a separate operation. After rolling or other forming the flanges could be formed into proper contour by hot or cold forming of the sheets on a mandrel or by forming under heat in a press. Inflation by inert gas may follow while so heated and clamped. The edges of the flanges could be either brazed or welded to secure the airfoil section and form the trailing and leading edges. While the plan form in Fig. 1 shows the face plates with a maximum width at the root, and gradually increasing in cord from the tip inward toward the root, the plan form could be varied with design. In the form shown cuffs for the shank of the blade are not needed since the thrust face and camber face extend from the tip to the root of the blade where the juncture is made with a spinner. The root of the blade could be rolled into a square section to be later turned externally and bored axially. The terminal exterior makes for pitch shifting movement of the blade within the hub socket, and the bore extending into the rib a depth determined by design makes for the housing of a blade torque unit by which the pitch shift of the blade is accomplished, and for location of the center of mass of the blade. The axial bore of the root aside from boring or drilling may be drawn or otherwise cavitated. It may be desirable to weld a filler section to the base end of the sheath around the root to close off the end of the blade instead of folding in web portions as suggested by the drawings.

Referring specifically to the drawing, Fig. 1 represents a roughly formed blade unit in which a billet of metal has been rolled, forged or otherwise fashioned to provide a root portion 10 rapidly merging at 12 into a narrow rib portion 14, on each side of which there are a pair of coextensive flanges 16 and 18 for the leading portion of the blade, and flanges 20 and 22 for the trailing portion. The extent of the flanges will roughly exceed the plan form configuration of the blade blank somewhat as indicated by the irregular outline 24 bounding the definite plan form lines of Fig. 1. Trimming or shearing of the flanges to the preferred design may result in the plan form indicated by the lines 26 along the root, then along 28 for the inward end of the sheath member or thrust face and camber face. However, instead of cutting the skirt portion of the face members off squarely as indicated at 28, web portions 30, 32 of suitable contour may be retained for folding along the lines 28. At any rate the flanges are suitably sheared or trimmed along the line 34 for the leading edge of the face members, along the line 36 for the tip, which blends into the curve 38 at the juncture of the tip and the trailing edge, and along the line 40 for the trailing edge of the face members.

That trimming will leave a work piece approximating the details of the unit for trimming and finishing, and resulting in a relative square section for the root and square edges along the lines 28, 34, 36, 38 and 40. The root portion 10 is turned down or otherwise fashioned into a cylindrical section 42 for rotatable mounting in a hub socket, and may be bored, or drilled deeply at 44 to provide a chamber to house the torque unit and balance assembly for the blade. The bore 44 extends into the tapered or merging portion of the root 10 and rib 14 so as to thin down the walls 46 which are drilled or bored at 48 to open the interior chambers of the blade to the hollow root, which facilitate final forming of the blade by the blow up method using an inert gas introduced through a fixture secured to the finished root 42. At the tip end of the work piece the end of the rib 14 is cut away between the face plates as indicated at 50 in Fig. 2, which allows for pinching or pressing the ends of the face plates together as indicated at 52 for closing the tip of the blade. The flanges of the face plates are appropriately beveled or machined along the lines or edges 34, 36, 38 and 40 as indicated at 54 and 56 in Fig. 6, so that the flanges when formed to desired contour will closely meet and be subject to bonding by weld or braze as indicated at 58 for the leading edge and 60 for the trailing edge. In the form of the juncture there shown the camber face 62 is made up of the flanges 18 and 22 and are lapped over the edge of the flanges 16 and 20 forming the thrust face 63 of the blade, and when secured by the bonding at 58, 60 and 52 form a hollow blade and spar of integral construction in which the hollow blade is divided into two coextensive chambers 64 and 66 extending along each side of the rib 14 with a cross communication at 50, and both leading out to the hollow root 42 through the passages 48.

It is contemplated that other forms of blades may be fabricated by the same methods, and also that blades of integral hollow construction may be formed by other than the exact steps set out in the foregoing, an alternative of which is to start with a metal blank of suitable dimensions to provide the plan form and having a thickness suitable for the rib member and two thicknesses of the blade face members, which blank is then slit along its edge inward toward the mid-section with the bottom of the kerfs for the slits diverging in approach from the tip toward the root end of the blank. After the slitting operation the material, such as the slabs on each side of each of the kerfs are spread apart and bent down to form the flanges 16, 18, 20 and 22, which may be done under heated conditions to save rupture of the connecting fibers. The spreading of the flanges and bending down to form relatively flat faces accomplishes the same configuration shown in Figs. 4 and 5, from which point the procedure outlined above may be followed for finishing the blade fabrication. Another form of rolling or forging a billet is shown in Fig. 7 where the central or spar section 140 is integrally joined to the webs 160, 180, 200 and 220, for subsequent working into the finished blade. The result of either procedure is to provide a hollow blade having a rib or spar and integrally joined face plates that are proof against springing or tearing loose by reason of insecure bonds. Bonds between metal parts are contemplated only along the edges of the members defining the plan contour of the blade and since the torsional stresses between the spar and face plates are taken by the molecular structure of the integral unit rather than some supplemental union of face members and spar, there is rendered a blade structure that is efficient, and structurally perfect beyond any question of failure.

While the embodiment of the present invention as herein disclosed, constitutes a preferred form, it is to be understood that other forms might be adopted, all coming within the scope of the claims which follow.

What is claimed is as follows:

1. In propeller manufacture, the method of making propeller blades which comprises working a piece of metal into rough shaped root and blade portions by extending the metal of a billet laterally thereof to provide pairs of oppositely disposed wide flanges converging along the length of the billet, trimming the pairs of flanges to blade plan form, working the trimmed flanges into a transverse spaced relation giving a contour of airfoil section bounded by the flanges, so as to meet in leading and trailing edge portions of the blade, bonding the meeting edges of the flanges to provide closed leading, trailing and tip edge portions, and working one end of the billet to provide a hollow cylindrical root portion having communication with the hollow spaces of the blade portion.

2. The method of making a hollow propeller blade which comprises working a rectangular section of metal billet into a deep flanged section with a connecting web of reduced dimension at one end, a pair of flanges being disposed on opposite sides of the web, trimming the pairs of flanges along the web to provide the face members of the blade in plan form, and trimming away the flanges of the worked billet remote from the reduced web to provide a root portion of the blade, reforming the opposed flanges along the web portion to provide cross-sectional contour to the blade with the edges of the opposed flanges meeting along the periphery of the blade, bonding the meeting edges of the flanges to close the tip, leading and trailing edge of the blade, and boring the root portion of the billet to communicate with the interior of the blade formed by the closed edges of the flanges and web.

3. The method of working a solid billet of metal into a hollow propeller blade, comprising the steps in combination, rolling the billet to provide an elongated central structure with diminishing solid cross section from one end to the other, and with longitudinally extending flanges in pairs diminishing in spacing coextensive with the diminishing of solid section of the central structure, shearing the flanges away from the central structure at the end having the greater solid section to provide a blade root portion, trimming the remaining portions of each flange to provide plan form for the blade throughout the length of the diminished solid section of the central structure, reworking the trimmed flanges to give enclosed hollow contour for the blade with diminishing airfoil section coextensive with the diminishing solid section of the central structure, and bonding the engaging edges of the reworked flanges to close off the blade edges.

4. The method of making a hollow propeller blade from a solid body of metal, comprising the steps in combination, working a portion of said metal body into a central web with oppositely disposed wide flanges at each edge of said web, bending the flanges at one end of the web to meet the flanges at the other edge of the web to form a pair of coextensive parallelly arranged coextensive chambers, bonding together the meeting portions of the flanges to seal the chambers, working the remaining portion of said body into a cylindrical root portion, boring axially of the root portion to open into both chambers, and inflating the chambers through the root while under heat and pressure.

5. The method of making a reinforced hollow propeller blade from a solid body of metal, comprising the steps in combination, forming the body into an elongated solid generally central member with two pairs of wide flanges extending transversely therefrom, bending the free edges of each pair of said flanges together, trimming the edges of the bent flanges to give contour to each edge of the blade, bonding the trimmed edge of the flanges to form a sealed chamber on each side of the central member, forming a blade mounting portion on one end of the solid central member, boring axially of the mounting portion to open into both of the sealed chambers, and inflating the chambers through the axial boring while the formed body is under heat and pressure to give predetermined airfoil section to the blade.

6. The method of making a reinforced hollow propeller blade from a solid body of metal, comprising the steps in combination, forming the body into an elongated solid generally central member with two pairs of wide flanges extending transversely therefrom, each pair of flanges relatively widely spaced from one another at one end of said central structure and decreasing gradually in spacing toward the opposite end of said central structure, bending the free edges of each pair of decreasingly spaced flanges to a meeting line to form an edge of the blade and close a longitudinal space on each side of the central structure, trimming the bent edges of the bent flanges to give plan form to the blade, bending the trimmed and bent edges of the flanges to seal the chambers along the central structure, working the central structure at the end of the widely spaced flanges into a blade mounting portion, and drilling axially of the central structure to open into the chambers along each side thereof, thence inflating the chambers while the body is heated to give airfoil section and continuity of surface to the blade.

BARTOW B. DUNCAN.

REFERENCES CITED

The following references are of record in the file of this patent:

UNITED STATES PATENTS

| Number | Name | Date |
| --- | --- | --- |
| 673,305 | Timms | Apr. 30, 1901 |
| 1,722,123 | Witherow | July 23, 1929 |
| 1,992,338 | Whitworth | Feb. 26, 1935 |
| 2,181,269 | Gehret | Nov. 28, 1939 |
| 2,205,132 | Blanchard | June 18, 1940 |
| 2,214,339 | McKee | Sept. 10, 1940 |
| 2,231,750 | Damerell | Feb. 11, 1941 |

FOREIGN PATENTS

| Number | Country | Date |
| --- | --- | --- |
| 574,168 | Germany | Apr. 10, 1933 |